United States Patent [19]

Copes

[11] 4,410,188

[45] Oct. 18, 1983

[54] SLURRY PUMP DOUBLE MECHANICAL SPLIT FACE SEAL

[76] Inventor: John C. Copes, 2750 McConnell Dr., Baton Rouge, La. 70809

[21] Appl. No.: 442,281

[22] Filed: Nov. 17, 1982

[51] Int. Cl.³ .................... F16J 15/38; F16J 15/46
[52] U.S. Cl. ..................................... 277/65; 277/3; 277/81 S; 277/87; 277/93 R; 277/199
[58] Field of Search ................. 277/3, 38–41, 277/65, 81 S, 87, 93 R, 93 SD, 187, 192, 197, 199

[56] References Cited

U.S. PATENT DOCUMENTS

| | | | |
|---|---|---|---|
| 2,921,806 | 1/1960 | Carter | 277/93 R |
| 2,996,319 | 8/1961 | Copes | 277/87 |
| 3,025,070 | 3/1962 | Copes | 277/65 X |
| 3,578,345 | 5/1971 | Copes | 277/81 S |
| 3,582,092 | 6/1971 | Amorese et al. | 277/87 |

FOREIGN PATENT DOCUMENTS 954883  4/1964  United Kingdom ............ 277/93 R

Primary Examiner—Robert S. Ward, Jr.
Attorney, Agent, or Firm—James M. Pelton

[57] ABSTRACT

A double mechanical split seal for easy repair or replacement and with low leakage in hard duty slurry service including two pairs of seal ring assemblies - one stationary and the other rotating - urged together about a shaft by a biasing spring, a drive for the rotating pair, a housing assembly for the seal ring assemblies having fluid pressurizing apparatus so that the tapered seal ring inserts are urged into sealing relation.

12 Claims, 6 Drawing Figures

4,410,188

SLURRY PUMP DOUBLE MECHANICAL SPLIT FACE SEAL

FIELD OF THE INVENTION

This invention relates to the field of mechanical seals. More particularly, this invention relates to split mechanical seals and the provision of inserts for mechanical seals used in heavy-duty service, such as slurry pumps in the phosphate industry, mining or hazardous slurries, coal-pipeline and similar areas.

BACKGROUND OF THE INVENTION

Split mechanical seals are disclosed in U.S. Pat. Nos. 2,996,319; 3,025,070; and 3,578,345 all issued to applicant. Split mechanical seals are required to permit easy removal and replacement of the seal ring inserts which are rotatable relative to each other in order to maintain equipment and sealing integrity and reduce labor and maintenance costs in cases where unavoidable wear between such inserts requires frequent replacement.

In machines employed in plants and in various other usages as operative equipment, and most commonly in centrifugal pumps, it is necessary to provide a seal between a rotary member, such as a shaft, and a stationary member, such as a housing, or conversely, between a rotary housing, and the like, and a stationary shaft, stud, pipe, or similar round member. Such seals, although made of wear resistant material, and often specially treated to increase resistance to abrasion, wear, or corrosion, nevertheless in service will wear away or become corroded so that it is necessary at relatively frequent intervals to replace the parts which are in surface to surface contact upon relative rotation therebetween.

Frequently, and as a general proposition, such parts of annular shape, integrally formed and not interrupted or split, will require removal of surrounding and adjacent machine parts, at a great expenditure of time and labor, and with consequent excess monetary loss, before ample access room can be had to permit replacement. For instance, in a case where a shaft may extend from a housing, the exterior bearing or journal member for such a shaft or otherwise parts connected to the shaft, as a coupling, externally part of the housing, will have to be removed before such wear elements can be brought into access position for removal. During this period, the machine driven by the shaft is "down" or inoperative, and its product is lost during the interval of repair. Also, it takes considerable time to remove sufficient parts to obtain access space for replacement of the wear elements.

The solution to this problem has resided in providing opposed ring inserts in adjacent rotary and stationary parts of a seal assembly, so that the elements containing the inserts do not have to be split, with the resultant chance of leakage between the adjacent split segments, but rather the ring inserts are split, while being adapted to maintain firm contact between adjacent segments of the ring inserts.

Although the result provided by split ring inserts to the problem of effective mechanical seal with high efficiency of repair or replacement is adequate for most machines and usages, there still remain problems with service which is extremely abrasive, such as slurry pumps and the like used in the phosphate mining industry, and where highly effective sealing is required, such as in mining or hazardous materials solution handling.

It is therefore an object of this invention to provide a split mechanical seal assembly for more effective use in abrasive solution service. Another object is to provide a split mechanical seal assembly or more efficient sealing under difficult conditions. A further object of this invention provides a split mechanical seal assembly which is cost and labor efficient in repair or replacement of seal ring inserts. A still further object of this invention is to provide a split mechanical seal assembly which effectively maintains its seal under little or no hydraulic pressure or under high pressure. These and other objects are accomplished by this invention as will be observed from the following description.

SUMMARY OF THE INVENTION

This invention accomplishes the above and other objects thereof by providing a split mechanical seal for a working shaft which comprises, in combination, an inner and outer pair of split ring inserts, one of each pair being stationary with and the other of each pair being rotatable with said shaft, a seal insert holder associated with each of said inserts and having a longitudinally and outwardly tapered recess for engagement with each of said inserts, said rotatable inserts being juxtaposed in back-to-back relationships urged apart by a biasing means.

DESCRIPTION OF THE DRAWINGS

In the Figures of the drawings, attached hereto and made a part hereof, like numbers refer to like parts. Particularly, the Figures are described as follows.

DETAILED DESCRIPTION OF PREFERRED EMBODIMENTS

Figure 1:
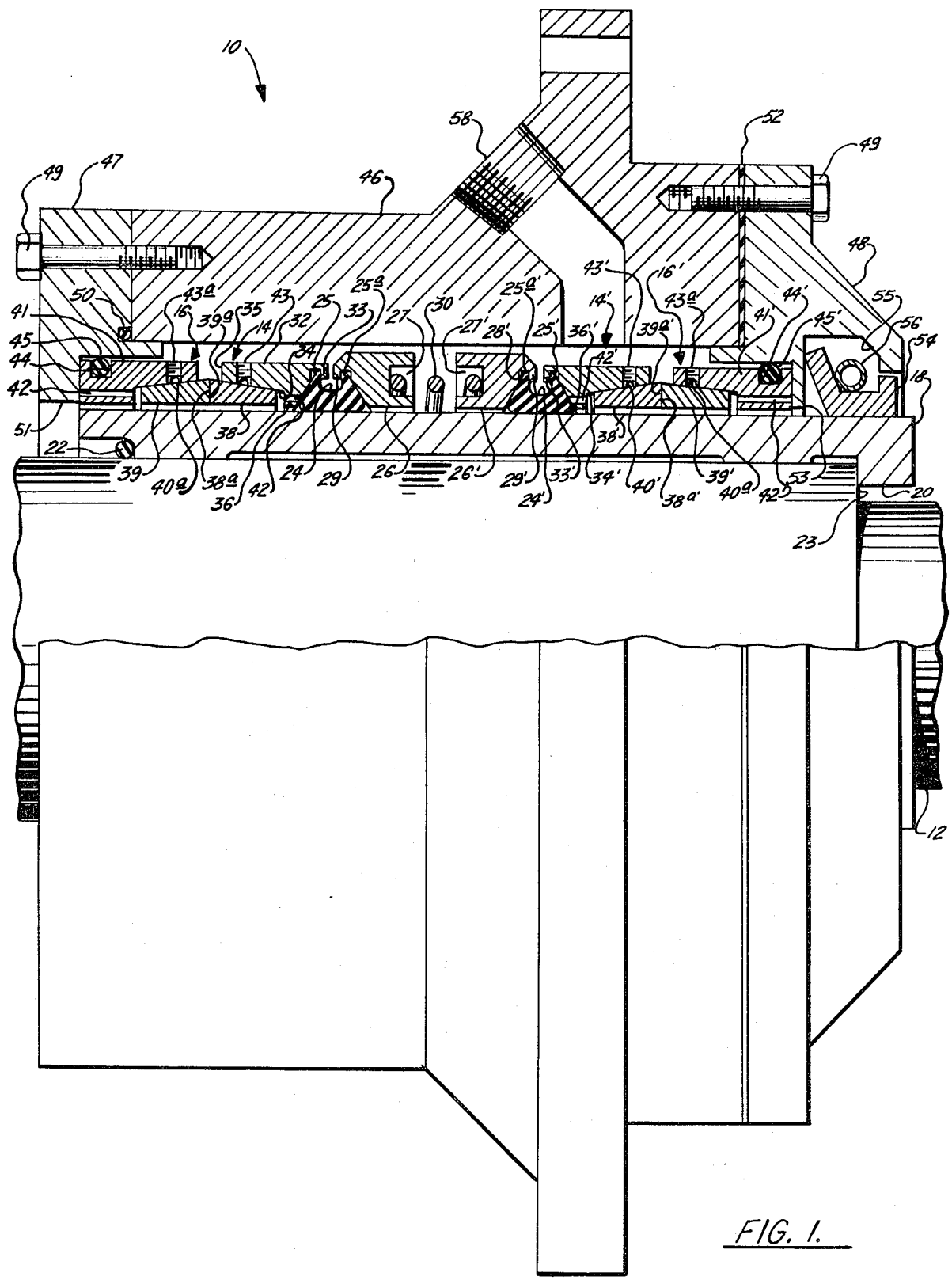
FIG. 1 is a partially cutaway sectional view of the split mechanical seal assembly of this invention.

Referring now in detail to the drawings, a double mechanical seal assembly 10 is shown in FIG. 1. It is disposed about a working shaft 12 and includes a pair of rotating sub-assemblies 14, 14' and a pair of stationary seal sub-assemblies 16 and 16'. Between shaft 12 and seal assembly 10 is sleeve 18. Sleeve 18 is slip fitted onto shaft 12 and held in place by frictional engagement with shaft 12, shaft-sleeve O-ring 22, and shoulder 23 on shaft 12, and sleeve end flange 20.

At the end of shaft 12 an impeller (not shown) is screwed onto the shaft 12 and tightens against the end flange 20 of sleeve 18, providing frictional fit of sleeve 18 on shaft 12. A pair of flexible rubber or elastomeric polymer drive rings 24, 24' are disposed about shaft sleeve 18. Their inside diameter is slightly less than the outside diameter of the shaft sleeve 18 so that compressive and frictional forces turn the drive rings with the rotation of shaft sleeve 18 as it turns with shaft 12. Drive rings 24, 24' have a broad base and end in upstanding flanges 25, 25a, 25' and 25a'. Drive ring flanges 25a and 25a' fit in recesses 28, 28' of compression rings 26, 26' and are held in place by undercut flanges 29, 29'. In each compression ring 26, 26' at the side opposite the flanges 29, 29' are circular channels 27, 27' into which coil spring 30 fits urging compression rings 26, 26' apart and bearing on drive rings 24, 24'. Drive ring flanges 25, 25', on the sides of drive rings 24, 24' opposite compression rings 26, 26', fit into undercut seal ring flanges 33, 33' of rotatable seal rings 32, 32'.

As shown in FIG. 1, rotatable seal rings 32, 32' are cylindrical rings having inner tapered surfaces 34, 34' into which inserts 38, 38' have been forced, such inserts each comprising two insert sections 38a, 38b, 38a' and 38b', as more fully shown in FIG. 3, formed by splitting the inserts 38, 38', preferably along irregular lines 73, as will be described more fully hereinbelow, see FIGS. 4, 5, and 6.

The inserts 38, 38' have their outer peripherys tapered at the same angles, preferably about 2° to about 8° as the inner surfaces 34, 34' of seal rings 32, 32'. Also the length or longitudinal extent of inserts 38, 38' is precalculated in connection with its outer diameter dimensions to permit inserts 38, 38' to be wedged into rotatable seal rings 32, 32' so that a portion of inserts 38, 38' projects out beyond rotatable seal rings 32, 32'. The length of the projection depends on the materials of construction, amount of wear encountered, the type of service and the design of the inserts. In general, approximately one eighth inch thereof projects out beyond the end face 35, 35' of the rotatable seal ring. When thus wedged into place the inserts 38, 38' fit so tightly that substantial force is required to remove it.

Conventionally, inserts are removed by providing knockout holes 42, 42' in the inwardly extending flanges 36, 36' of rotatable seal rings 32, 32' so that a punch may be used to remove inserts 38, 38' by punching them out. However, better removal can be effected by providing in each of rings 32, 32' an annular groove 40, 40' in the inner tapered periphery 34, 34' of rotatable seal ring 32, 32'. If this annular groove 40, 40' is located positively with relation to the outer ends of 35, 35' of rotatable seal rings 32, 32' and if the outer end of inserts 38, 38' bears a definitely known distance from the ends 35, 35' of rotatable seal rings 32, 32' with the degree of taper known, it is possible to calculate the total area of frictional contact between the inner surfaces 34, 34' of rotatable seal rings 32, 32' and the horizontal component of the area of grooves 40, 40', the difference being the equivalent annular surface against which there is friction. These considerations are more fully illustrated and explained in U.S. Pat. No. 3,578,345 to Copes, which is hereby incorporated by reference herein as if fully set forth. The calculations define the size of grooves 40, 40' which are necessary to inject hydraulic fluid at about 500 pounds per square inch pressure through a grease fitting (not shown) attached to tapped bores 43, 43' communicating with grooves 40, 40' and eject inserts 38, 38' from rotatable seal rings 32, 32'.

Inserts 38, 38' have sealing faces 38a and 38a' which are frictionally borne upon by the faces 39a, 39a' during the course of rotation. It should be noted that stationary inserts 39, 39' are in all functional aspects equivalent to rotatable inserts 38, 38'. Preferably, the inserts are all of the same design, material and construction.

As shown in FIG. 1, stationary inserts 39, 39' have a tapered outer periphery matching the tapered inner surface of stationary seal ring insert holders 41, 41' which function as do rotatable seal rings 32, 32', to hold stationary inserts 39, 39' against rotatable seal ring inserts 38, 38' effecting the seal. Holders 41, 41' also have grooves 40a, 40a' connected by tapped bores 43a, 43a' for the purpose of injecting hydraulic fluid to eject stationary inserts 39, 39' from holders 41, 41'. Inserts 39, 39' in like manner each comprise two insert sections 39a, 39b and 39a', 39b' formed by splitting the inserts 39, 39' preferably along irregular lines 73, as shown more fully hereinafter.

Figure 2:
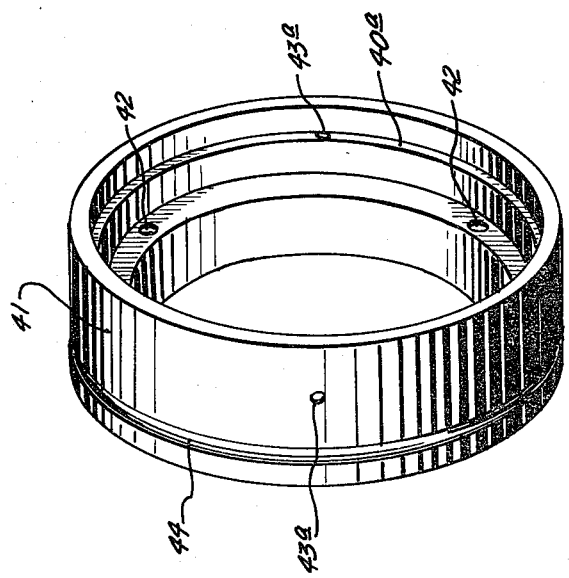
FIG. 2 is a perspective view of a seal ring insert holder.

Stationary split seal ring insert holder 41 is more particularly shown in FIG. 2, including knock out hole 42, hydraulic fluid pressure removal groove 40a, tapped bore 43a and O-ring channel 44. O-ring 45 in FIG. 1 seals and prevents rotation of stationary split insert seal ring holder 41. In all aspects holder 41' is identical to holder 41.

As shown in FIG. 1, the seal assemblies 14, 14', 16, and 16' are contained within housing 46 having end flange 47 and tapering hub 48 attached to housing 46 by bolts 49. Housing 46 is sealed by O-ring 50 to end flange 47 and by gasket 52 to hub 48. End flange 47 and hub 48 also provide shoulders or flanges 51 and 53, respectively, which limit longitudinal movement of stationary seal assemblies 16 and 16', thus resisting the thrust of rotatable seal assemblies 14 and 14', effecting frictional bearing seal between their respective insert faces.

Hub 48 also has recess 55 in which an excluder 54 generally of a rubber material which is inert to the product solution, acts as a primary seal to keep most of the product out. The excluder 54 is held in place by a spring ring 56.

Housing 46 has a clear and clean fluid inlet 58 which can be attached to a fluid source for pressurizing the seal assemblies 14, 14', 16 and 16' to urge the sealing faces together because of fluid action on the projected surfaces. Thus, in effect the fluid may act as a biasing means while the coil spring 30 may be useful to maintain sealing relation under low fluid pressure or when the pump has slurry product solution, but is not operating. This feature of the invention is important to maintain seal integrity at all times.

Figure 3:
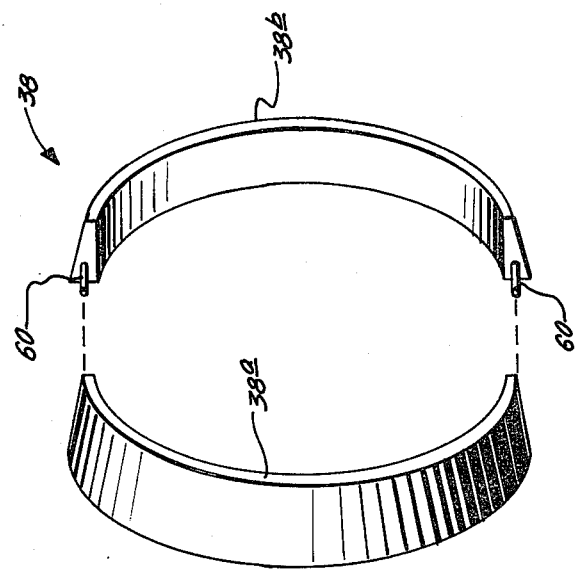
FIG. 3 is an exploded perspective view of a split seal ring insert.

In FIG. 3 one embodiment of the seal ring insert, such as for example, 38 is shown in exploded view. In this embodiment the two insert sections 38a and 38b are shown apart. Dowels 60 in insert section 38b are provided to fit corresponding recesses (not shown) in insert section 38a to insure aligned interfitment and identification of each segment or section 38a and 38b. Such split insert sections are more fully described in U.S. Pat. No. 2,996,319 which is hereby incorporated by reference as if fully set forth.

Figure 4:
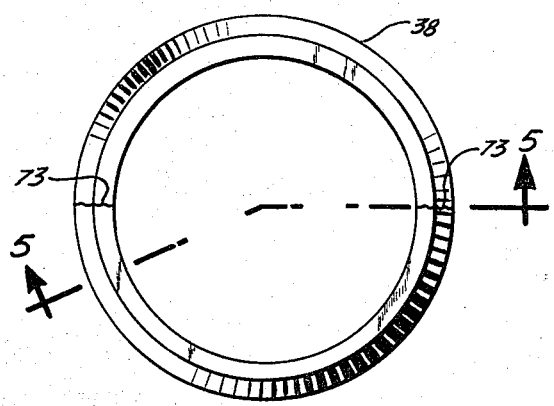
FIG. 4 is a plan view of a split seal ring insert which is a variation of the insert of FIGS. 1 & 3, including a special hardened ring bonded to the insert face.
Figure 5:
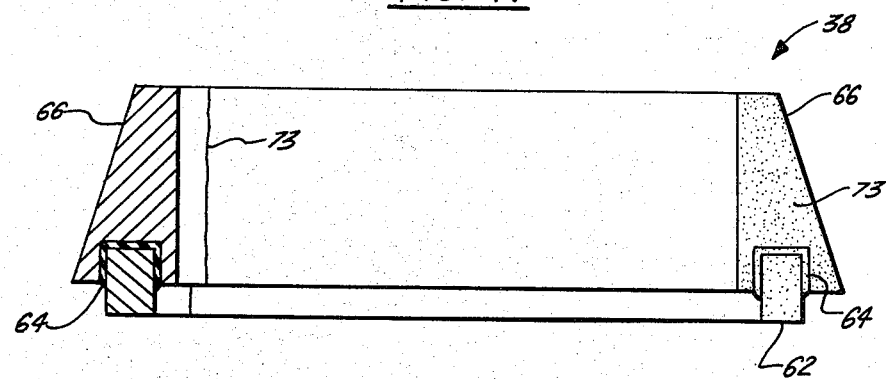
FIG. 5 is a section view taken along lines 5—5 of FIG. 4 of a split seal ring insert showing a hardened seal face material and stepped construction.
Figure 6:
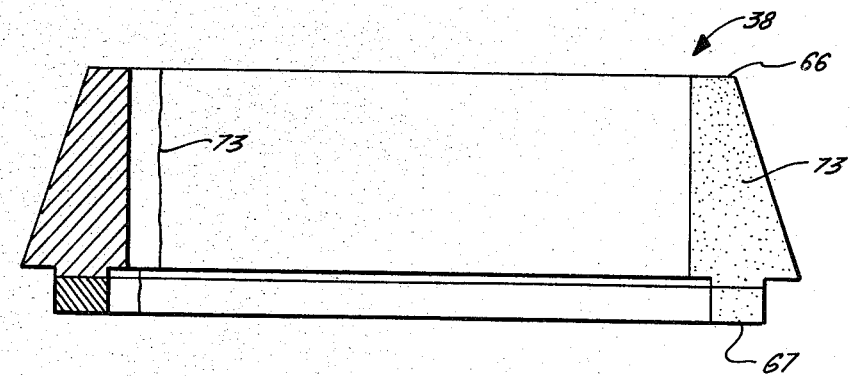
FIG. 6 is a sectional view taken along lines 5—5 of FIG. 4 embodying another variation of the insert of FIG. 4 of a split ring insert having powder metallurgy layer built up in a ring and machined to provide a stepped construction for the face.

In FIGS. 4-6, there are illustrated additional preferred embodiments of components of the invention, particularly composite split seal ring inserts which are split along irregular lines 73 as referred to hereinabove. In a split seal ring insert, such as for example, insert 38, the insert can be placed in a vise and struck with a hammer to cause a split, producing irregular peaks and valleys along the split. These irregularties can be used for repositioning or aligning the halves of the split insert 38 in place of dowels. Also, the halves are then match marked and not interchangeable. The advantage obtained by these broken surfaces resides in the fact that less leakage takes place through an extent of matched broken surfaces than can take place through lapped surfaces. Additionally, since the split does not have to be machined, less time and labor are required thus lowering costs of manufacture.

As particularly illustrated in FIGS. 5 and 6, the split seal ring insert 38, is provided with a specially hardened ring 62 or 67 embedded in or bonded to the body of the insert, for illustrative purposes, insert 38. In FIG. 5 there is illustrated a hardened alloy ring 62, for example, specially hardened tungsten steel, tungsten carbide, chrome carbide and similar materials having a Rockwell hardness of C-60 or greater. The backing or body 66 of insert 38 may be of cast iron or other less hard metal with an epoxy resin silver solder or other binder 64 effecting a bond between backing 66 and hardened ring 62. In another variation and preferred embodiment illustrated in FIG. 6, powder metallurgy is used to build up a layer of hardened material which is applied and machined back below the hardened metal layer so that only the hardened ring 67 derived from powdered metal technology is used as the seal face. Seal ring inserts 38', 39 and 39' can be of like construction.

In another variation and preferred embodiment, several tangential splits equally spaced about the split seal ring insert are effected whereby the split begins on the inner surface of the insert and extends tangentially from the inner surface to the outer surface. This tangentially split seal ring insert upon rotation of the seal faces against another tangentially split seal ring insert has little or no tendency to make line contact with the split of the opposed seal ring insert which might cause work hardening or embrittlement at the split. The tangential split effects a moving point contact upon rotation past an opposed split ring insert.

Although reference has been made to split seal rings for their advantageous features of easy access for repair or replacement, slurry pump mechanical seals can be employ non-split or whole ring inserts. These function in all other aspects, except repair or replacement, in the same manner as the split seal ring inserts. However, on installation any equipment attached to the shaft must be removed so that the seal ring assembly can be slipped over the end of the shaft.

From a reading of the above description it is clear that the invention has been described illustratively so that one skilled in the art will be able to make variations and changes in the invention within the scope and spirit thereof. Accordingly, it is desired that the invention be limited only by the lawful scope of the following claims.

What is claimed is:

1. A split mechanical seal for a working shaft which comprises, in combination, an inner and an outer pair of ring inserts disposed about said shaft, one of each pair being stationary and the other being rotatable with said shaft with one of said rotatable seal inserts facing in sealing relation one of said stationary inserts, a pair of stationary and a pair of rotatable seal insert holders associated respectively with said pair of stationary and said pair of rotatable inserts and each insert holder having longitudinally and outwardly tapered recess for engagement with each of said inserts, said rotatable seal insert holders being juxtaposed in back-to-back relationships and urged apart by a biasing means.

2. The combination of claim 1 wherein the rotatable seal insert holders are engaged with drive means frictionally attachable to said shaft whereby said rotatable seal insert holders revolve with said shaft.

3. The combination of claim 2 wherein said biasing means is a coil spring disposed about said shaft.

4. The combination of claim 3 wherein said coil spring is engaged in a recess of a compression ring which is attached to said drive means.

5. The combination of claim 1 wherein said shaft has a wear sleeve interposed between said seal assembly and said shaft.

6. The combination of claim 5 wherein said seal assembly is enclosed in a housing having an operating fluid attachment, so that upon rotation of said shaft the internal fluid pressure urges said rotating and stationary seal inserts together.

7. The combination of claim 1 wherein said seal inserts are composite shouldered inserts having hardened face materials.

8. The combination of claim 1 wherein both rotatable holders are engaged with drive means resiliently attachable to said shaft and said biasing means is a coil spring having a diameter larger than said shaft.

9. The combination of claim 1 wherein said rotatable inserts are urged toward said stationary inserts by means of a coil spring attached to a recess in a compression ring on each end of said spring, each of said compression rings being resiliently attached to one side of a drive means frictionally attachable to said shaft, the other side of said drive means being resiliently attached to said insert holder.

10. The combination of claim 9 in which said drive means is an elastic synthetic rubber ring having in cross-section a base and upstanding sides.

11. The combination of claim 2 wherein said dirve means are movable axially on said shaft and with respect to a housing enclosing said seal.

12. The combination of claim 1 wherein each of said stationary holders has at least one O-ring in an annular groove around the outside periphery of said holder, whereby together with said drive means, said inserts and said biasing means a seal unit is formed so that product slurry is not leaked when said shaft runs out of true.

* * * * *